G. T. TEEL.
Meat Broiler.
No. 44,026.
Patented Aug. 30, 1864.
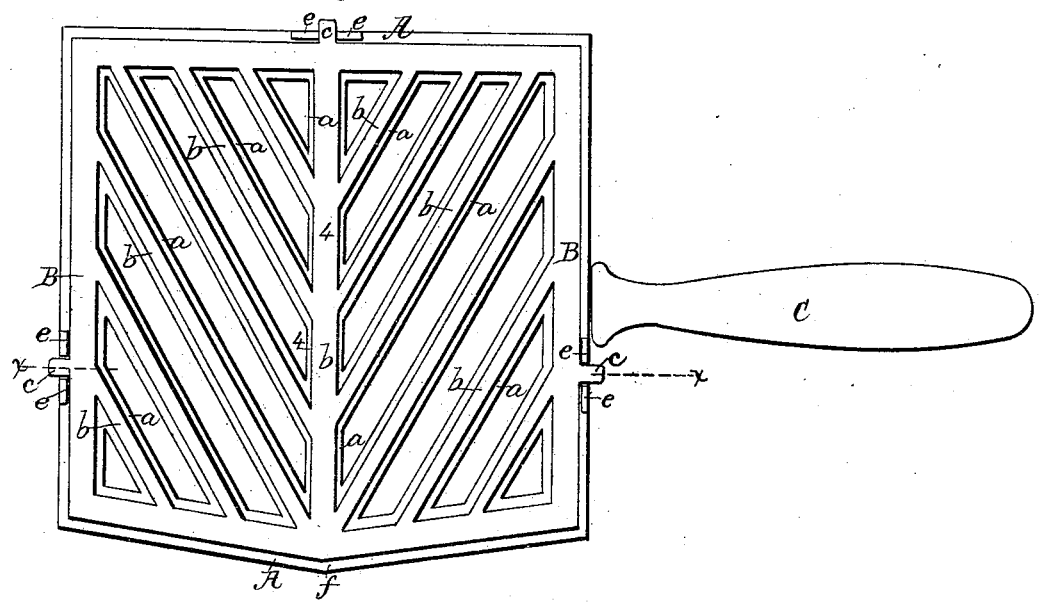
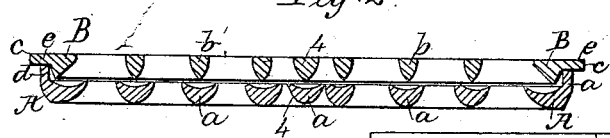
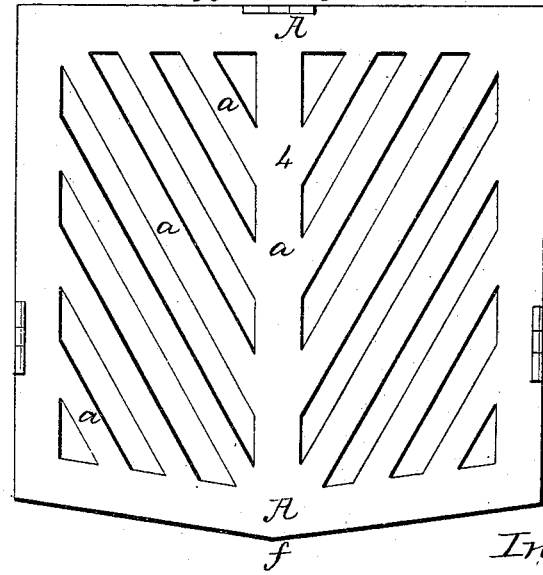
Witnesses.
James R Hall
Geo. H Reed
Inventor.
Geo. T. Teel.

UNITED STATES PATENT OFFICE.

GEORGE T. TEEL, OF HOBOKEN, NEW JERSEY.

IMPROVEMENT IN MEAT-BROILERS.

Specification forming part of Letters Patent No. 44,026, dated August 30, 1864.

*To all whom it may concern:*

Be it known that I, GEORGE T. TEEL, of Hoboken, in the county of Hudson and State of New Jersey, have invented a new and Improved Broiler for Broiling Meats, &c.; and I do hereby declare that the following is a full, clear, and exact description of the same, reference being had to the accompanying drawings, forming part of this specification, in which—

Figure 1 is a top view of the broiler. Fig. 2 is a vertical section of the same in the plane indicated by the line $x\,x$ of Fig. 1. Fig. 3 is a top view of the lower part of the broiler.

Similar letters of reference indicate corresponding parts in the several figures.

The object of this invention is to prevent, as m ch as possible, the fat and gravy from the meat from dripping into the fire, and producing smoke, blaze, or unpleasant smell, and to enable broiling to be performed satisfactorily over an anthracite or other fire.

It consists in the combination of two series of bars arranged one above the other at a short distance apart, the lower ones having their upper surfaces of trough or gutter shape, and the upper ones, upon which the meat rests, being narrower and beveled toward the bottom to a thin edge, so that the fat and juices from the meat running down their sides will drop into gutters or troughs of the lower series, and not into the fire. The parts are so constructed and combined that the lower bars all converge or lead to one point, where the fat and gravy may be collected, and whence they can be poured off, either for use with the broiled meat or to be saved for any other purpose.

To enable others to make my improved broiler, I will proceed to describe it with reference to the drawings.

$a\,a$ are the lower series of bars, formed in the same piece with or otherwise rigidly secured at their ends to a surrounding frame, A, to which is attached the handle C. These bars and their frame may be of cast or wrought iron. The said bars and frame have their upper surfaces or trough or gutter shape, as shown in Fig. 2, and are beveled toward the bottom for the free passage between them of the heat from the fire.

$b\,b$ are the upper series of bars, narrower than the lower ones, and formed in the same piece with or rigidly attached at their ends to a surrounding frame, B, of a form and size corresponding with the lower frame, A, the whole being either of cast or wrought iron. The said frame B is made with three or more horizontally-projecting lugs, $c\,c$, at suitable points on its exterior to rest on vertical projections $d\,d$ upon the lower frame, A, to support the upper frame and bars at a very short distance above and out of contact with the lower ones, the said projections $d\,d$ having each upon them two still higher projections, $e\,e$, to come one on each side of each lug $c$, for the purpose of keeping the upper frame and bars directly over the centers of the wider lower frame and bars.

In each series of bars there is one central bar (marked 4) extending right across the frame, and one side of each frame, with which the said central bar is connected, is made with a slight angle or curve, as shown at the bottom of Figs. 1 and 3.

On each side of the central bars, 4, the other bars of each series are arranged diagonally, all converging toward the central bars and the curved or angular sides of the frames in such manner that the gutters or troughs of the lower series of bars will convey the fat or other fluids collected in them toward the curved or angular side of the lower frame, from the middle of which they may be poured out at $f$, as from a spout, by inclining the broiler with that side downward.

The operation of this broiler is as follows: The broiler having been placed upon the fire, the meat is placed upon the upper series of bars, and when the fat and juices exude therefrom they trickle down the sides of the upper bars, $b\,b$, and are collected in the trough or gutters of the lower series, $a\,a$, instead of falling into the fire and producing smoke, flame, and an unpleasant smell, while the meat is cooked by the radiated heat from the fire passing between the bars and coming in direct contact with it. When the meat has been cooked, and after it has been taken off, the fat and juices collected in the gutters or troughs of the lower bars, $a\,a$, and frame A are poured off at the point $f$ by inclining the broiler to bring that point lower than any other part.

I disclaim the trough or gutter shaped bars when used separately.

I do not claim dropping the gravy from an upper to a lower set of fluted bars; but

What I claim as new, and desire to secure Letters Patent, is—

The construction, combination, and arrangement of two separate and movable parts, as described and represented.

GEO. T. TEEL.

Witnesses:
M. M. LIVINGSTON,
GEO. W. REED.